Dec. 4, 1962
F. G. BECKER
3,066,341
TRACTOR CONSTRUCTION
Filed June 25, 1962
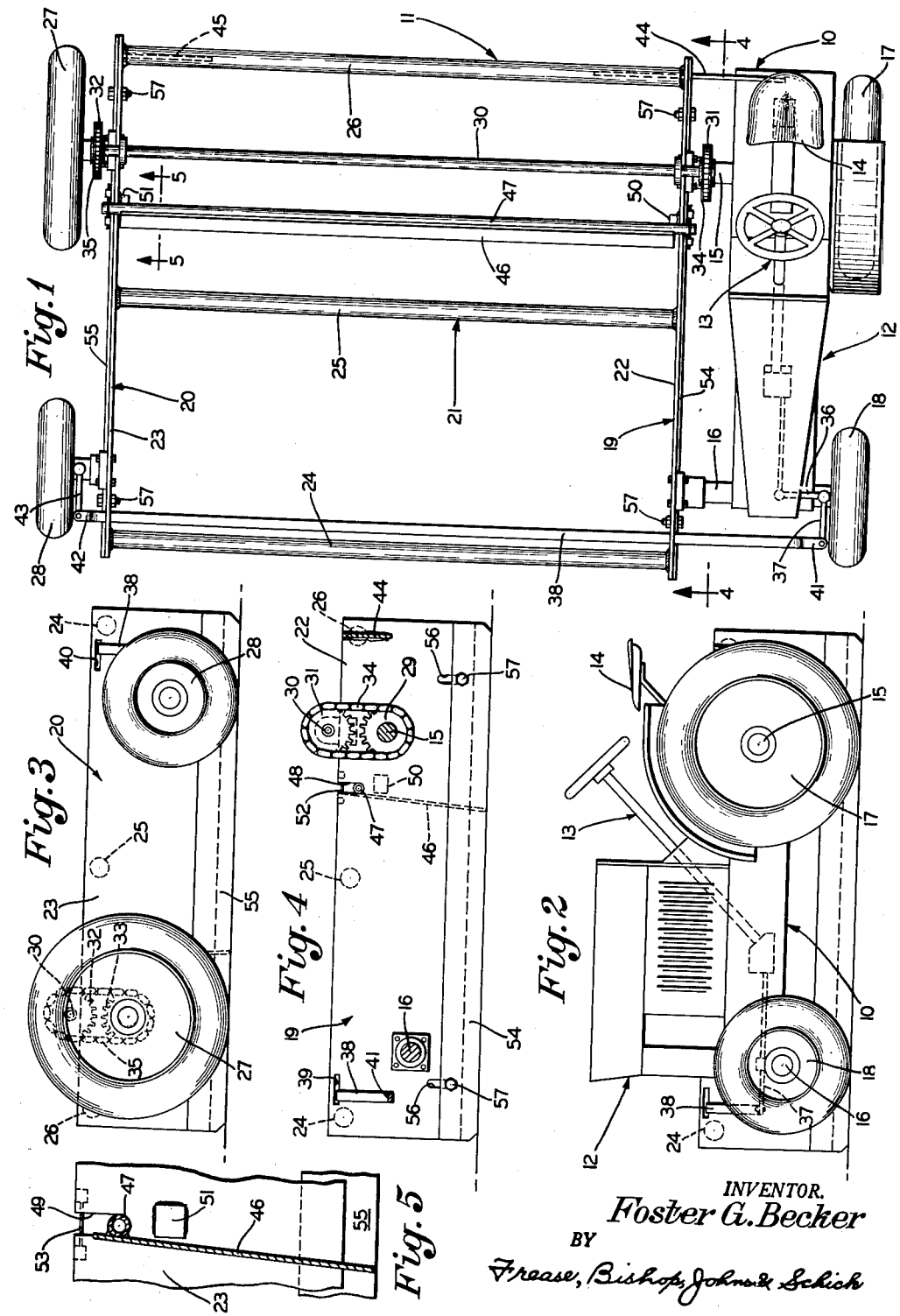
INVENTOR.
Foster G. Becker
BY
Frease, Bishop, Johns & Schick
ATTORNEYS

United States Patent Office 3,066,341
Patented Dec. 4, 1962

3,066,341
TRACTOR CONSTRUCTION
Foster G. Becker, R.D. 6, near Wooster, Ohio
Filed June 25, 1962, Ser. No. 204,744
6 Claims. (Cl. 15—93)

My invention relates to improvements in tractor construction, and more specifically to tractors of the type having scrapers permanently mounted thereon and formed as an integral part thereof. Even more specifically, my invention relates to tractors of the type adapted for performing various scraping operations around modern farm buildings.

Certain prior constructions of tractors have been provided having various forms of scrapers attached thereto, either as an integral part of the tractor or as a detachable accessory. In the normal case, the scraping device is suspended either at the front or rear of the tractor, and in some cases suspended directly therebeneath.

The principal difficulty with these prior forms of tractors adapted for performing the usual scraping operations is that there are many occasions around the modern farm when clearance is at a minimum, yet it is desirable to perform scraping operations in these limited clearance areas. In view of the fact that in the usual construction, the scraping device, is directly in front of, to the rear, or beneath the main part of the tractor, it is impossible to direct the tractor into these limited clearance areas. In these cases and with only these prior constructions available, it is therefore necessary to perform many scraping and clean-up operations by hand, which is not only time consuming, but in many cases makes it impossible to properly accomplish these operations.

One situation on the modern farm where this has become a particular problem is in the case of large chicken farms. In this type of farm, the chickens are usually housed in large sheds within which must be contained individual wire cages, one for each of the chickens, and the number of chickens in each shed is usually many thousands.

For most convenient operation, the various chicken cages in the sheds are suspended approximately twenty to twenty-four inches from the floor surface, aligned in a series of rows lengthwise of the particular shed. Furthermore, the sides and bottoms of the cages are formed entirely of wire mesh, so that all of the waste from the chickens will be deposited through the bottoms of the cages directly to the floor surface below.

Thus, it is necessary to scrape these floor areas directly underlying the cages and this is even difficult to perform by hand in view of the twenty to twenty-four inch clearance space within which this scraping operation must be performed. Certain difficulties have been eliminated in some cases by installing a shallow pit directly beneath the cages, but this has only added slightly more clearance space in order that the hand operation can be more easily accomplished.

It is, therefore, a general object of the present invention to provide a tractor construction having a unique form of scraping means formed as an integral part thereof, whereby the scraping operation in this limited clearance area may be easily, quickly and efficiently accomplished without the need for the usual tedious hand labor.

It is a primary object of the present invention to provide a tractor construction of the foregoing type having outrigger scraping means so formed thereon, such that the main portion of the tractor may be power driven along the aisles between low clearance cages, while the scraping means may travel directly beneath the cages and accomplish the scraping operation.

It is a further object of the present invention to provide a tractor construction of the foregoing type in which one side of the tractor is supported and movable in the usual manner, whereas the other side of the tractor is supported directly on and movable with an outrigger scraping means, with the entire constructin being fully controlled for powered movement and steering from the tractor and remote from the outrigger scraping construction.

It is still a further object of the present invention to provide a tractor construction of the foregoing type having an outrigger scraper formed thereon in which side plates are provided for the scraper which maintain the material being scraped in proper position ahead of the scraper and are automatically adjustable for conforming to various uneven floor surfaces.

Finally, it is an object of the present invention to provide a tractor construction of the foregoing type which accomplishes all of the above objects in a simple and efficient manner and requires a minimum of cost for the provision thereof.

These and other objects are accomplished by the parts, constructions, arrangements, combinations and subcombinations comprising the present invention, a preferred embodiment of which—illustrative of the best mode in which applicant has contemplated applying the principles—is set forth in the following description and illustrated in the accompanying drawings, and which is particularly and distinctly pointed out and set forth in the appended claims forming a part hereof.

In general terms, the tractor construction comprising the present invention may be stated as including a tractor main frame having the usual power means and the usual steering means mounted thereon. Further, a driven wheel and a steerable wheel are operably connected movably supporting one side of this main frame, with the driven wheel being operably connected to the power means for rotation by the power means and the steerable wheel being operably connected to the steering means for selective control by this steering means.

Still further, an outrigger auxiliary frame is secured to the other side of this tractor main frame, with this auxiliary frame preferably being formed generally inverted U-shaped and having one generally vertical leg secured to the tractor main frame and the other generally vertical leg spaced from this main frame other side, providing a free side of the auxiliary frame spaced from this main frame other side. Another driven wheel and another steerable wheel are mounted on the auxiliary frame free side operably connected to the auxiliary frame for movably supporting the auxiliary frame free side and thereby also movably supporting the main frame other side.

Scraper means, preferably in the form of a pivotal scraper blade, is suspended on the auxiliary frame outward of the main frame, and in the case where the auxiliary frame is generally U-shaped, this scraping blade is preferably pivotally suspended between the auxiliary frame generally vertical legs. The driven wheel on the auxiliary frame free side is operably connected back to the power means on the main frame for rotation by this power means, and the steerable wheel on the auxiliary frame free side is operably connected back to the usual steering means on the main frame for selective control by this steering means. Further, in both cases, this operable connection back to the main frame is preferably at the upper portion of the auxiliary frame in order to provide proper clearance for the scraping blade.

Finally, the pivotal connection of the scraping blade to the auxiliary frame leg portions is preferably formed for some vertical floating of the scraping blade to conform to uneven floor surface and obstructions. Also, side guards or attachments may be provided on the lower edges of the auxiliary frame leg portions adjacent the edges of the scraping blade, with these side guards also preferably being mounted for limited vertical floating to again automatically conform to uneven floor surfaces.

By way of example, an embodiment of the tractor construction comprising the present invention is illustrated in the accompanying drawings forming a part hereof, wherein like numerals indicate similar parts throughout the several views, and in which:

FIG. 1 is a top plan view of the tractor construction;

FIG. 2, a side elevation of the tractor construction of FIG. 1, looking from the main frame side;

FIG. 3, a side elevation of the tractor construction of FIG. 1, looking from the auxiliary frame side;

FIG. 4, a sectional view, part in elevation, looking in the direction of the arrows 4—4 in FIG. 1; and FIG. 5, an enlarged fragmentary sectional view, part in elevation, looking in the direction of the arrows 5—5 in FIG. 1.

Referring to the drawings, the embodiment of the tractor construction of the present invention illustrated includes a main frame, generally indicated at 10, and an outrigger auxiliary frame, generally indicated at 11. The tractor main frame 10 may be, for the main part, of usual construction, provided with the usual power driving means, generally indicated at 12, the usual steering means, generally indicated at 13, and the operator's seat 14.

The main frame 10 is also provided with the usual power axle 15 operably connected to the power driving means 12 and mounted at the rear of the main frame in the usual manner. Further, the main frame 10 is provided with the usual front axle 16, likewise operably connected to the main frame in the usual manner.

A driven wheel 17 is mounted on the power axle 15 at one side of the main frame 10, which in this case is the left hand side of the main frame, and this driven wheel 17 is operably connected to the power driving means 12 in the usual manner for rotation of the driven wheel by the power driving means. A steerable wheel 18 is operably connected to and rotatable on the front axle 16 at this same left hand side of the main frame 10, and this steerable wheel is operably connected to the steering means 13 for the usual steering control by this steering means. Thus, driven wheel 17 and steerable wheel 18 movably support the left hand side of the main frame 10 in the usual manner.

The auxiliary frame 11 is preferably formed generally inverted U-shaped, having the upstanding or vertically extending inner and outer leg portions 19 and 20 and the generally horizontally extending connecting portion 21. The inner and outer leg portions 19 and 20 are preferably formed by generally rectangular plate members 22 and 23, respectively, with the connecting portion 21 preferably being formed by a series of spaced tubular members 24, 25 and 26 secured to the plate members 22 and 23 in any usual manner, such as by welding.

The inner leg portion 19 of the auxiliary frame 11 is secured to the main frame power axle 15 for rigid support between this leg portion 19 and power axle 15, but for the usual rotation of the power axle relative to the leg portion. This inner leg portion 19 is also secured to the front axle 16 of the main frame for rigid support therebetween.

A second driven wheel 27 is rotatably secured to the outer leg portion 20 of the auxiliary frame 11, that is, at the free side of this auxiliary frame, and driven wheel 27 is preferably laterally aligned with the driven wheel 17 on the main frame power axle 15. Furthermore, a second steerable wheel 28 is rotatably mounted on the outer leg portion 20 of the auxiliary frame 11 operably connected movable for the usual steering function and preferably laterally aligned with the steerable wheel 18 on the main frame front axle 16.

A driving sprocket member 29 is mounted on the main frame power axle 15 adjacent the inner leg portion 19 of the auxiliary frame 11 and this driving sprocket member is operably connected to the power axle for rotation by the power driving means 12 in the same manner as the rotation of the main frame driven wheel 17. Furthermore, a jack shaft 30 is rotatably mounted in usual manner at the upper edges of both the inner and outer leg portions 19 and 20 of the auxiliary frame 11, preferably laterally aligned with both of the main frame power axle 15 and the auxiliary frame driven wheel 27.

A sprocket member 31 is mounted secured to the inner end of the jack shaft 30 overlying the driving sprocket member 29 on the main frame power axle 15, and a sprocket member 32 is secured to the outer end of the jack shaft 30 overlying a driven sprocket member 33 secured rotatable with the auxiliary frame driven wheel 27. These various sprocket members are operably connected for transmitting rotatable power therethrough by the usual sprocket chains 34 and 35. Thus, rotatable power is transmitted from the power driving means 12 on main frame 10 through the main frame power axle 15 to the driving sprocket member 29, through jack shaft 30 to the driven sprocket member 33 on the auxiliary frame 11 and, therefore, to the auxiliarly frame driven wheel 27.

A usual steering arm 36 is secured to the main frame steerable wheel 18 and operably connected to the steering means 13 for control of steerable wheel 18 by the steering means 13 in the usual manner. An auxiliary steering arm 37 is also secured to the main frame steerable wheel 18, preferably extending forwardly of the steering arm 36.

A generally laterally extending steering link 38 is laterally slidably positioned extending through slots 39 and 40 formed near the upper edges of the auxiliary frame inner and outer leg portions 19 and 20, respectively. The inner end 41 of steering link 38 is formed downwardly, as shown, and is pivotally connected to the auxiliary steering arm 37 of the main frame steerable wheel 18. Also, the outer end 42 of the steering link 38 is formed downwardly, outwardly of the auxiliary frame outer leg portion 20, where this end 42 is pivotally connected to a steering arm 43 secured to and for controlling steerable movement of the auxiliary frame steering wheel 28.

Thus, the auxiliary frame steerable wheel 28 is controlled for proper steering action through the steering link by slidable movement of this steering link relative to the auxiliary frame inner and outer leg portions 19 and 20. Steering link 38 is in turn controlled through the auxiliary steering arm 37 by the main frame steering means 13, so that both the main frame steerable wheel 18 and the auxiliary frame steerable wheel 28 are simultaneously steerably controlled by the main steering means 13 on the main frame 10.

In the tractor construction of the present invention, therefore, the main frame 10, having the usual power driving means 12 and by steering means 13, is movably supported at one side, that is, the left hand side, by the usual driven wheel 17 and steerable wheel 18. At the other side, however, that is, the right hand side, the main frame 10 is supported on the inner side of the auxiliarly frame 11, with the outer side of this auxiliary frame being movably supported on the driven wheel 27 and steerable wheel 28.

Thus, the right hand support for the usual main frame in this particular tractor construction is through the outrigger auxiliary frame 11 and into the driven and steerable wheels 27 and 28 positioned remote from the usual right hand side of the usual main frame. In order to provide additional support between the main frame 10 and auxiliary frame 11, as well as rigidity for the auxiliary frame, lateral reinforcing plates 44 and 45 may be provided, plate 44 between the main frame and auxiliary frame and also extending into the auxiliary frame tubular member 26, and the plate 45 extending between tubular member 26 and the auxiliary frame outer leg portion 20.

Still further, both of the driven wheels 17 and 27 are driven by the power driving means 12, wheel 17 directly in the usual manner, and wheel 27 remotely from the main frame 10 across the auxiliary frame by the jack shaft 30. Finally, both steerable wheels 18 and 28 are simultaneously controlled for proper steering from the steering means 13 on the main frame 10, steerable wheel 18 again directly in the usual manner, and steerable wheel 28 remotely through the auxiliary frame 11 by the steering link 38.

A scraping blade 46 is pivotally suspended on the auxiliary frame 11 by means of the suspension tube 47 having the ends thereof pivotally received in the upwardly opening, general U-shaped slots 48 and 49 formed in the auxiliary frame plate members 22 and 23, respectively. Scraping blade 46 is preferably positioned angling downwardly and forwardly, as best seen in FIGS. 4 and 5, and is prevented from moving rearwardly beyond center by the stop lugs 50 and 51 secured to the auxiliary frame plate members 22 and 23, respectively, as shown.

The purpose of suspending the scraping blade 46 from these slots 48 and 49 in the auxiliary frame plate members 22 and 23 is so that this scraping blade 46 is somewhat vertically floating, normally retained in the downward position shown merely from gravity, but permitted to move upwardly within slots 48 and 49 in the event obstructions or uneven floor surfaces are encountered. Further, to prevent complete separation of the scraping blade 46 from the auxiliary frame 11, the keeper rods 52 and 53 are mounted on the auxiliary frame plate members 22 and 23, respectively, closing the upper ends of slots 48 and 49.

Finally, in order to properly contain material being scraped in front of the scraping blade 46, the auxiliary frame plate members 22 and 23 which, as shown, are adjacent the ends of the scraping blade, are provided with floating lower edges in the form of the guards or plate attachments 54 and 55 on the plate members 22 and 23, respectively. These plate attachments 54 and 55 are mounted on the lower edges of the plate members 22 and 23 for vertical floating relative to these plate members by means of a series of slots 56 and bolts 57, so that normally the lower surfaces of these plate attachments will slide along a floor surface containing material being scraped within the confines of the auxiliary frame 11 and in front of the scraping blade 46, but in the event obstructions or uneven floor surfaces are encountered, these plate attachments may move vertically upwardly the extent of the slots 56.

It should be noted and is most important to the present invention, that the auxiliary frame 11 properly carrying the scraping blade 46 may be formed of a limited height considerably less than the main frame portion of the tractor construction, that is, the main frame 10 carrying the power driving means 12, steering means 13 and seat 14. Thus, the scraping blade 46 is suspended on the outrigger auxiliary frame 11, which auxiliary frame has an overall height such that this auxiliary frame may pass through low clearance areas, for instance, through an area having a clearance of only twenty inches, beneath chicken cages as discussed in the foregoing.

At the same time, both the auxiliary frame 11, as well as the usual main frame 10 are properly driven from the power driving means 12 through the main frame driven wheel 17 and the remote auxiliary frame driven wheel 27. Also the entire construction is properly steered from the main frame steering means 13 through the main frame steerable wheel 18 and remotely through the auxiliary frame steerable wheel 28. In both cases, the driven and steerable wheels provide the entire movable support for the tractor construction, that is, for the main frame 10 and auxiliary frame 11.

With the construction described in the foregoing, therefore, power scraping means is provided for quickly and conveniently scraping floor surfaces in areas of extremely low clearance. Furthermore, means is provided for conveniently containing material being scraped properly in front of the scraping blade 46 and both this containment means and the scraping blade 46 are mounted for vertical floating necessary when uneven floor surfaces or obstructions are encountered.

In the event the floor surfaces in these limited clearance areas are provided with the usual pits, as described in the foregoing, it is merely necessary to adapt the scraping blade in the usual manner depending on the conditions encountered. For instance, the scraping blade could be merely lowered, or formed of any necessary contour, and these changes, clearly within the knowledge of one skilled in the art, are fully contemplated within the principles of the present invention.

In the foregoing description, certain terms have been used for brevity, clearness and understanding but no unnecessary limitations are to be implied therefrom, because such words are used for descriptive purposes herein and are intended to be broadly construed.

Moreover, the embodiment of the improved construction illustrated and described herein is by way of example and the scope of the present invention is not limited to the exact details of construction shown.

Having now described the invention, the construction operation and use of the preferred embodiment thereof, and the advantageous new and useful results obtained thereby, the new and useful construction and reasonable mechanical equivalents thereof obvious to those skilled in the art are set forth in the appended claims.

I claim:

1. Tractor construction including a main frame having power driving means mounted thereon, a driven wheel operably mounted on the main frame movably supporting one side of the main frame and operably connected to the power driving means for rotation by said power driving means, steering means mounted on the main frame, a steerable wheel operably connected movably supporting said main frame one side and operably connected to the steering means for control by said steering means, an auxiliary frame secured to the other side of the main frame opposite from said one side with said auxiliary frame having a free side spaced outwardly from said main frame other side, a driven wheel rotatably mounted on the auxiliary frame free side spaced outwardly from the main frame movably supporting said main frame other side and the auxiliary frame, said auxiliary frame driven wheel being operably connected to the main frame power driving means for rotation by said power driving means, a steerable wheel operably connected to the auxiliary frame free side spaced outwardly from the main frame movably supporting said main frame other side and the auxiliary frame, said auxiliary frame steerable wheel being operably connected to the main frame steering means for control by said steering means, and scraper means suspended on the auxiliary frame outward of said main frame other side.

2. Tractor construction as defined in claim 1 in which the auxiliary frame is generally inverted U-shaped in configuration including generally vertically extending leg portions and an upper connecting portion; in which one of said auxiliary frame leg portions is secured to the main frame other side providing rigid support between the main frame and auxiliary frame; and in which the auxiliary frame driven and steerable wheels are operably mounted on the auxiliary frame other leg portion opposite and outward from said one leg portion.

3. Tractor construction as defined in claim 1 in which the auxiliary frame is generally inverted U-shaped in configuration including generally vertically extending leg portions and an upper connecting portion; in which one of said auxiliary frame leg portions is secured to the main frame other side providing rigid support between the main frame and auxiliary frame; in which the auxiliary frame driven and steerable wheels are operably mounted on the auxiliary frame other leg portion opposite and outward from said one leg portion; in which the scraper means includes a scraper blade suspended between the auxiliary frame leg portions; and in which vertically floating leg portion attachment means is formed at the lower edge of each of the auxiliary frame leg portions for slidably abutting a floor surface.

4. Tractor construction as defined in claim 1 in which the auxiliary frame is generally inverted U-shaped in configuration including generally vertically extending leg portions and an upper connecting portion; in which one of said auxiliary frame leg portions is secured to the main frame other side providing rigid support between the main frame and auxiliary frame; in which the auxiliary frame driven and steerable wheels are operably mounted on the auxiliary frame other leg portion opposite and outward from said one leg portion; and in which the scraper means includes a scraping blade pivotally suspended on the auxiliary frame leg portions.

5. Tractor construction as defined in claim 1 in which the auxiliary frame is generally inverted U-shape in configuration including generally vertically entending leg portions and an upper connecting portion; in which one of said auxiliary frame leg portions is secured to the main frame other side providing rigid support between the main frame and auxiliary frame; in which the auxiliary frame driven and steerable wheels are operably mounted on the auxiliary frame other leg portion opposite and outward from said one leg portion; and in which the scraper means includes a scraping blade operably connected to and extending closely adjacent the auxiliary frame leg portions for pivotal and limited vertical floating movement relative to said leg portions.

6. Tractor construction as defined in claim 1 in which the auxiliary frame is generally inverted U-shaped in configuration including generally vertically extending leg portions and an upper connecting portion; in which one of said auxiliary frame leg portions is secured to the main frame other side providing rigid support between the main frame and auxiliary frame; in which the auxiliary frame driven and steerable wheels are operably mounted on the auxiliary frame other leg portion opposite and outward from said one leg portion; in which vertically floating leg portion attachment means is formed at the lower edge of each of the auxiliary frame leg portions for slidably abutting a floor surface; and in which the scraper means includes a scraping blade operably connected to and extending closely adjacent the auxiliary frame leg portions for pivotal and limited vertical floating movement relative to said leg portions.

No references cited.